(12) United States Patent  
Garcia et al.

(10) Patent No.: US 11,990,970 B2  
(45) Date of Patent: May 21, 2024

(54) METHODS AND APPARATUSES OF MULTI-USER MULTIPLE-INPUT MULTIPLE-OUTPUT BEAM SELECTION AND USER PAIRING USING DEEP LEARNING

(71) Applicant: Nokia Technologies Oy, Espoo (FI)

(72) Inventors: Ian Dexter Garcia, Naperville, IL (US); Igor Filipovich, Chicago, IL (US); Chandrasekar Sankaran, Hoffman Estates, IL (US); Hua Xu, Hawthorn Woods, IL (US); Suresh Kalyanasundaram, Bangalore (IN); Jamil Shihab, Algonquin, IL (US); Rajeev Agrawal, Glenview, IL (US); Anand Bedekar, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 704 days.

(21) Appl. No.: 17/252,966

(22) PCT Filed: Jun. 20, 2019

(86) PCT No.: PCT/EP2019/066351  
§ 371 (c)(1),  
(2) Date: Dec. 16, 2020

(87) PCT Pub. No.: WO2020/002127  
PCT Pub. Date: Jan. 2, 2020

(65) Prior Publication Data  
US 2021/0218460 A1 Jul. 15, 2021

(30) Foreign Application Priority Data

Jun. 28, 2018 (IN) .............................. 201811024097

(51) Int. Cl.  
*H04W 72/04* (2023.01)  
*G06N 20/00* (2019.01)  
(Continued)

(52) U.S. Cl.  
CPC ........... *H04B 7/0695* (2013.01); *G06N 20/00* (2019.01); *H04B 7/0452* (2013.01)

(58) Field of Classification Search  
CPC .... G06N 20/00; H04B 7/0452; H04B 7/0456; H04B 7/0695  
See application file for complete search history.

(56) References Cited

U.S. PATENT DOCUMENTS 8,520,616 B2  8/2013  Cui et al.  
8,644,422 B2  2/2014  Gao et al.  
(Continued)

FOREIGN PATENT DOCUMENTS

CN    102474870 A    5/2012  
CN    103369688 A    10/2013  
WO    2019/190476 A1    10/2019

OTHER PUBLICATIONS

Office Action received for corresponding Chinese Patent Application No. 201980043206.3, dated Jan. 5, 2023, 7 Pages of office action and no page of translation available.

(Continued)

*Primary Examiner* — Phuc H Tran  
(74) *Attorney, Agent, or Firm* — Joseph C. Drish; Harrington & Smith

(57) ABSTRACT

Systems, methods, apparatuses, and computer program products for multi-user (MU) multiple-input multiple-output (MIMO) user pairing selection are provided. One method may include selecting multi-user multiple input multiple output (MU MIMO) candidate beams using deep neural network(s) (DNNs), and selecting paired users based on the (Continued)

selected beams. The deep neural network(s) (DNNs) are trained to maximize multi-user priority metric (MU-PM) or a heuristic of the multi-user priority metric (MU-PM).

18 Claims, 10 Drawing Sheets

(51) Int. Cl.
*H04B 7/0452* (2017.01)
*H04B 7/06* (2006.01)

(56) References Cited

U.S. PATENT DOCUMENTS

| | | | |
|---|---|---|---|
| 9,972,339 B1* | 5/2018 | Sundaram | G01S 3/8083 |
| 2011/0280197 A1 | 11/2011 | Brueck et al. | |
| 2014/0128109 A1* | 5/2014 | Li | H04W 68/02 |
| | | | 455/458 |
| 2015/0071190 A1 | 3/2015 | Lau et al. | |
| 2016/0149622 A1 | 5/2016 | Ma | |
| 2018/0092086 A1 | 3/2018 | Nammi et al. | |
| 2019/0191425 A1* | 6/2019 | Zhu | H04W 72/046 |
| 2019/0372644 A1* | 12/2019 | Chen | H04W 88/12 |
| 2021/0127382 A1* | 4/2021 | Garcia | H04W 72/542 |

OTHER PUBLICATIONS

Office Action received for corresponding Indian Patent Application No. 201811024097, dated Sep. 12, 2022, 7 Pages.

Office Action received for corresponding Indian Patent Application No. 202117000699, dated Jan. 4, 2022, 7 Pages.

Hottinen et al., "Optimal User Pairing in Downlink MU-MIMO with Transmit Precoding", 6th International Symposium on Modeling and Optimization in Mobile, Ad Hoc, and Wireless Networks and Workshops, Apr. 1-3, 2008, 3 pages.

International Search Report and Written Opinion received for corresponding Patent Cooperation Treaty Application No. PCT/EP2019/066351, dated Sep. 9, 2019, 12 pages.

Kue et al., "Beam Management for Millimeter Wave Beamspace MU-MIMO Systems", arXiv, Oct. 10, 2017, 6 pages.

Klautau et al., "5G Mimo Data for Machine Learning: Application to Beam-Selection Using Deep Learning", Information Theory and Applications Workshop (ITA), Feb. 11-16, 2018, 9 pages.

* cited by examiner

METHODS AND APPARATUSES OF MULTI-USER MULTIPLE-INPUT MULTIPLE-OUTPUT BEAM SELECTION AND USER PAIRING USING DEEP LEARNING

RELATED APPLICATION

This application claims priority to PCT Application No. PCT/EP2019/066351, filed on Jun. 20, 2019, which claims priority to Indian Application No. 201811024097, filed on Jun. 28, 2018, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to multi-user (MU) multiple-input multiple-output (MIMO) user pairing in such systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method, which may include selecting multi-user multiple input multiple output (MU MIMO) candidate beams using deep neural network(s) (DNNs) and selecting paired users based on the selected beams. The deep neural network(s) (DNNs) are trained to maximize multi-user priority metric (MU-PM) or a heuristic of the multi-user priority metric (MU-PM).

Another embodiment is directed to an apparatus that may include at least one processor and at least one memory comprising computer program code. The at least one memory and computer program code may be configured, with the at least one processor, to cause the apparatus at least to select multi-user multiple input multiple output (MU MIMO) candidate beams using deep neural network(s) (DNNs), and to select paired users based on the selected beams. The deep neural network(s) (DNNs) are trained to maximize multi-user priority metric (MU-PM) or a heuristic of the multi-user priority metric (MU-PM).

Another embodiment is directed to an apparatus that may include circuitry configured to select multi-user multiple input multiple output (MU MIMO) candidate beams using deep neural network(s) (DNNs), and circuitry configured to select paired users based on the selected beams. The deep neural network(s) (DNNs) are trained to maximize multi-user priority metric (MU-PM) or a heuristic of the multi-user priority metric (MU-PM).

Another embodiment is directed to an apparatus that may include means for selecting multi-user multiple input multiple output (MU MIMO) candidate beams using deep neural network(s) (DNNs), and means for selecting paired users based on the selected beams. The deep neural network(s) (DNNs) are trained to maximize multi-user priority metric (MU-PM) or a heuristic of the multi-user priority metric (MU-PM).

Another embodiment is directed to a non-transitory computer readable medium comprising program instructions stored thereon for performing at least: selecting multi-user multiple input multiple output (MU MIMO) candidate beams using deep neural network(s) (DNNs) and selecting paired users based on the selected beams. The deep neural network(s) (DNNs) are trained to maximize multi-user priority metric (MU-PM) or a heuristic of the multi-user priority metric (MU-PM).

In certain embodiments, the selecting of the candidate beams may include selecting, by a single-stage deep neural network (DNN) beam selector, the candidate beams simultaneously through a single pass of the deep neural network (DNN).

In some embodiments, the selecting of the candidate beams may include selecting, by a multi-stage deep neural network (DNN) beam selector, one beam at a time for each stage.

In certain embodiments, the method may further include calculating a user priority metric representing a relative priority of a user in scheduling. In some embodiments, the method may include calculating a beam priority metric using at least the user priority metric.

In certain embodiments, the method may include performing mathematical transformations to the beam priority metric, and encoding the transformed beam priority metric. In some embodiments, the method may include determining beam neural network (NN) metrics that represent at least one of normalized selection probabilities or Q-values of a Bellman equation, using the encoded beam priority metric.

In certain embodiments, the selecting of the candidate beams may include selecting at least one beam based on the beam neural network (NN) metrics. In some embodiments, the selecting of the at least one beam may include comparing the beam neural network (NN) metrics with a common threshold to discriminate among beams.

In certain embodiments, the selecting of the at least one beam may include sorting the beams according to the beam neural network (NN) metrics and selecting first L beams from the sorted beams. In some embodiments, the selecting of the candidate beams may include selecting zero or one beam based on the beam neural network (NN) metrics.

In certain embodiments, the method may also include, after selecting said zero or one beam, discarding, from selection at future stages, other beams that cause high cross-beam interference to said selected zero or one beam. In some embodiments, the method may include determining whether to proceed to a next stage to add another layer based on a value of a termination flag.

In certain embodiments, the method may include determining a final beam selection from among the candidate beam selections via a selection criterion. In some embodiments, the selecting of the paired users may include determining a set of users from the final beam selection by at least one of discarding un-associated users or selecting a best user of each beam. According to an embodiment, the method may also include storing at least one of the final beam selection, selected user or user pairs in volatile or non-volatile memory.

In certain embodiments, the selecting of the candidate beams may include producing N beam combinations using the deep neural network(s) (DNNs), and selecting, from the N beam combinations, a single beam combination that produces maximum utility.

In some embodiments, the selecting of the candidate beams may include producing N beam combinations using the deep neural network(s) (DNNs) and zero or more beam combinations using non-DNN methods, and selecting, from among the N beam combinations and zero or more combinations produced by non-DNN methods, a single beam combination that produces maximum utility.

In certain embodiments, the method may also include training the deep neural network(s) (DNNs) with training samples, wherein at least one of the following policies are used to create the training samples: exhaustive search policy, multi-user greedy policy, crossbeam interference (CBI)-free greedy policy, or random greedy hybrid policy.

BRIEF DESCRIPTION OF THE DRAWINGS

For proper understanding of example embodiments, reference should be made to the accompanying drawings, wherein.

DETAILED DESCRIPTION

Figure 1:
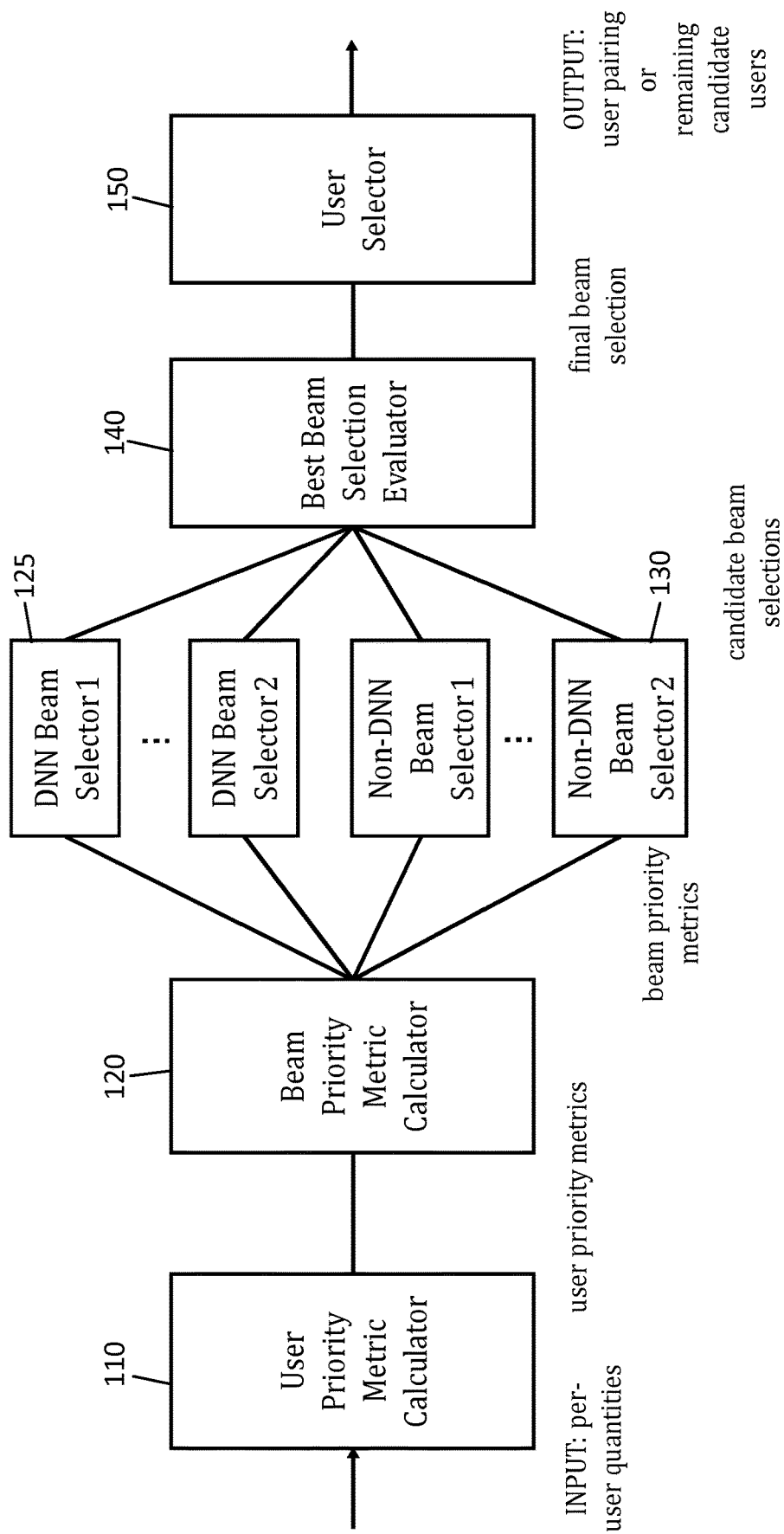
FIG. 1 illustrates an example of a multi-user MIMO user pairing system using deep learning, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for multi-user (MU) multiple-input multiple-output (MIMO) user pairing selection, for example using deep learning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In a multi-user MIMO (MU-MIMO) system, a base station (BS) with multiple antennas may communicate with multiple users. Typically, the BS amplifies and shifts the phases of the transmitted or received signals at each antenna in order to improve the signal quality of data streams (i.e., diversity combining) or to simultaneously send or receive multiple data streams to one or more users (i.e., spatial multiplexing). The amplification, phase shifting, and combining of the signals at the antennas can be thought of as applying a set of "weights" to the signal and forming "beams" toward a certain spatial direction relative to the antenna orientation. Each beam may enhance the relative received/transmitted signal strength towards some directions while decreasing the relative signal strength towards other directions.

The antenna weights for the beam for a user can be directly computed from the time-varying channel estimates for the user. This is known as non-codebook based beamforming or precoding, wherein the number of beams B equals the number of users U. Alternatively, a fixed set of beams (i.e., grid of beam (GoB)) can be employed by a BS for all transmissions or receptions. This is known as codebook based beamforming or precoding. The BS scheduler selects which among the fixed set of beams is/are best for each user at each data transmission or reception, where its decision of which beam(s) is/are best for the user may be aided by feedback from the user.

In practice, a user may utilize multiple paired quasi-orthogonal beams for a single transmission or reception burst, where the selection of one beam implies the selection of the other paired beams. However, for simplicity, it may be assumed in some embodiments herein that a user is associated to a single beam from among the B available beams.

For each time-frequency-code radio resource unit (RU), the BS may simultaneously schedule L ($1 \leq L \leq L_{max}$) user layers, wherein a user layer is assigned its unique beam.

Once the beams are selected, the users associated to those beams remain as the candidate users for transmission/reception, while the remaining users may be discarded.

A MU-MIMO user pairing problem relates to deciding the appropriate set of beams and the corresponding set of users at each radio resource.

A goal of MU-MIMO pairing is to maximize the total utility by maximizing its gradient, known as the multi-user priority metric (MU-PM) at each radio resource at each pairing opportunity.

Selecting the L-layers out of a potential of B beams that maximizes the total scheduler metric is a hard combinatorial problem. For example, selecting 4 beams out of 32 requires >30 thousand choices, while selecting 8 beams out of 64 requires >4 billion choices.

Since evaluating the MU-PM is typically computationally expensive time-wise or memory-wise and the search space of the selection may be very large, performing the combinatorial search may be infeasible for real-time applications. On the other hand, less-computationally expensive heuristic may be computationally simple but provide selections that greatly underperform compared to the optimal selection. Thus, there is a need for a relatively computationally inexpensive MU-MIMO pairing scheme for real-time applications that can perform as close as possible to that of optimal selection. Example embodiments described herein address at least these problems.

Certain embodiments provide a method and apparatus that utilize one or more deep neural networks (DNNs) which perform the selection of paired users. It is noted that, as used herein, deep learning may refer to the use of DNN(s). Instead of directly performing the MU-PM calculation and search of candidate beam selections through heuristic or combinatorial schemes, one embodiment uses DNN(s) to perform beam selections. The paired users may then be chosen based on the selected beams. Each deep neural network (DNN) may accept as an input the quantities for calculating priority metrics (PM) and is trained to maximize the MU-PM or a heuristic of the MU-PM. Because of a DNN's parallel architecture and operational simplicity, an embodiment of the DNN-based scheme can quickly and efficiently calculate a MU-MIMO beam selection and user pairing that can outperform conventional heuristic and combinatorial-search schemes.

Certain embodiments may include one or more operational blocks or units, as illustrated in the example system diagram of FIG. 1. As depicted in FIG. 1, the system may include a user priority metric calculator 110, a beam priority metric calculator 120, DNN beam selector(s) 125, non-DNN beam selector(s) 130, a best beam selection evaluator 140, and/or a user selector 150. In the example of FIG. 1, the input to the system may include per-user quantities for calculating PM, and the output may include a user pairing or remaining candidate users. It is noted that one or more of the blocks illustrated in FIG. 1, and in FIGS. 2-8 discussed below, may comprise circuitry for performing the functionality thereof.

In an embodiment, DNN beam selector 125 may be of two types: a single-stage DNN beam selector and/or a multi-stage DNN beam selector. In the single-stage DNN beam selector, scheduled beams are simultaneously selected through a single pass of the DNN. In the multi-stage DNN beam selector, each stage has a DNN that selects one beam at a time. The selection problem is a dynamic program.

For either case, the DNN inputs are beam priority metric (or a transform of the beam priority metric) and their outputs are either normalized selection probabilities P, or the Q values of the Bellman equation, where the Q represents the potential incremental MU-PM for that beam at a given state. When Q values are output, then the DNN is also known as a Deep-Q-Network (DQN).

Figure 2:
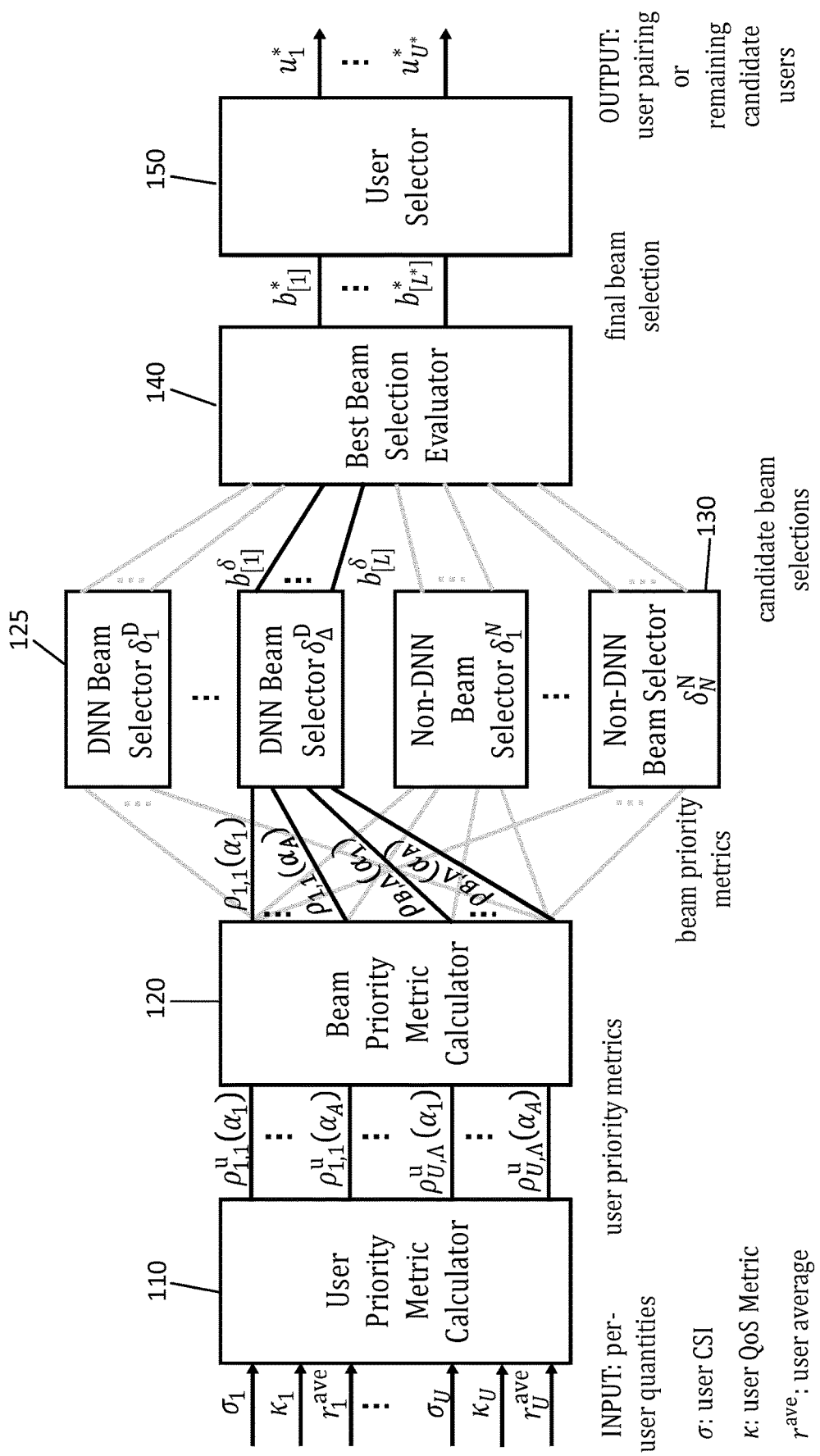
FIG. 2 illustrates an example of a multi-user MIMO user pairing system using deep learning showing inputs-outputs, according to an embodiment.

FIG. 2 illustrates an example embodiment of a system, which includes a user priority metric calculator 110 as introduced above. A user priority metric (UPM) informs the scheduler of the relative priority of a user in scheduling. As an example, if only one user can be selected for a resource, then user A will be selected instead of user B when user A has a higher UPM value compared to user B. The UPM for the uth user ($\rho_{u,L}^u(\alpha)$) is a function of the user channel state information (CSI) ($\sigma$), the user Quality-of-Service (QoS) metric $\kappa$, the user average throughput ($r^{ave}$), the total cross-beam interference ratio (TCBI) ($\alpha$), the power splitting factor $\psi_L$ based on the number of co-scheduled users, and the number of resource units allocated to the user ($w_u$), for example, according to the following equation:

$$\rho_{u,L}^u(\alpha) = F(\sigma_u, \kappa_u, r_u^{ave}, \alpha, \psi_L, w_u). \quad (1)$$

The QoS metric factors into the UPM non-throughput criteria such as traffic class packet priority, delay target priority, user class, retransmission index priority, signalling/control priority, etc. The TCBI ($\alpha$) is the ratio of the total received power of the crossbeam interference (CBI) to the power of the user's beam(s). For a user at an RU using the ith beam, in which there are other beams simultaneously using that RU, the TCBI is given as:

$$\alpha(\{\backslash i\}) \triangleq \sum_{\forall j \neq i} \alpha(i,j) = \frac{1}{\xi_i} \sum_{j \neq i} \xi_j, \quad (2)$$

wherein $\{\backslash i\}$ a represents the indices of the set of beams $j \neq i$ that are co-scheduled with the ith beam. $\xi_k \in \mathbb{R}_{+ +}$ is the received (or projected) power of the kth beam to the user and js are the indices of the co-scheduled beams to the ith beam.

If the user CSI represents (or estimates) the Signal-to-Interference-Noise-Ratio (SINR) for the user under no crossbeam interference ($\alpha=0$), then it is referred to as the single-user SINR (SU-SINR), denoted as $\chi^{SU}$.

The multi-user SINR (MU-SINR) ($\chi_u^{MU}$) may be expressed as a function of the SU-SINR through the ff. equation:

$$\chi_u^{MU} \triangleq \frac{\psi_L \chi_u^{SU}}{\alpha \psi_L \chi_u^{SU} + 1}, \quad (3)$$

where the power splitting factor $\psi_L$ depends on the power splitting scheme. Under static power splitting, $\psi_L=1$, whereas, under dynamic power splitting, $\psi_L=\nabla/L$, where $\nabla$ is the maximum number of users.

Ultimately, the user throughput under MU-MIMO is a function of the MU-SINR, and so is the UPM:

$$\rho_u^u(\chi_u^{MU}) = F(\chi_u^{MU}, \kappa_u, r_u^{ave}, w_u). \quad (4)$$

Some commonly-used UPM definitions based on the scheduler policy may include: A Proportionally-fair Scheduler for example given by:

$$\rho_u^{u,PF} \triangleq \frac{\kappa_u}{r_u^{ave}} R^{inst}(\chi_u^{MU}, w_u) \quad (5)$$

wherein $R^{inst}(s_u^{MU})$ is the predicted instantaneous throughput as a function of the MU-SINR. A Channel-unaware Equal-throughput scheduler for example given by:

$$\rho_u^{u,CUET} \triangleq \frac{K_u}{r_u^{ave}} \quad (6)$$

A Channel-aware Equal-throughput Scheduler for example given by:

$$\rho_u^{u,CAET} \triangleq \frac{K_u}{(r_u^{ave})^2} R^{inst}(\chi_u^{MU}, w_u) \quad (7)$$

A Maximum Throughput Scheduler for example given by:

$$\rho_u^{u,MT} \triangleq \kappa_u R^{inst}(\chi_u^{MU}, w_u) \quad (8)$$

The example system of FIG. 2 may also include a beam priority metric calculator 120. Conceptually, beam priority is similar to user priority in that, if a single beam can be selected for an RU, then ith beam is selected over the jth beam if the beam priority metric (BPM) of the ith beam is greater than that of the jth beam. Since multiple users can be associated to the same beam, beam selection can be performed as an intermediate step for user selection to reduce the dimensionality of the problem (i.e., simplify the problem). First, the users may be grouped into beams, then the beams are selected, and then the users associated to those beams are selected. The BPM may be calculated for each combination of: beam ID b=1, . . . , B; samples of TCBI $\alpha = \sigma_1, \ldots, \alpha_A$, where A is the number of TCBI samples based on implementation choice; and, if under dynamic power splitting, the number of co-scheduled user layers.

If a single user is to be selected for the beam, the utility-maximizing user selection for that beam is to select the associated user with the highest UPM, and, the BPM is the following:

$$\rho_{b,L}(\alpha) = \begin{cases} \max_u \rho_{u,L}^u(\alpha, w_u = W) \forall u \mid b = b_u, \; b \in \{b_1, \ldots, b_U\} \\ 0, \quad \text{otherwise} \end{cases} \quad (9)$$

where W is the total number of RUs allocated for the beam and $b_u$ is the associated beam to the uth user. In other words, the BPM is the maximum UPM associated to that beam.

In certain scenarios, such as under bursty traffic, it may be desirable to select multiple users simultaneously scheduled on the beam, where the users share orthogonal RUs within the user layer. In this case, the BPM is the sum of UPMs, where each UPM is calculated based on the user's share of RUs for its beam ($w_{u,b}$):

$$\rho_{b,L}(\alpha) = \quad (10)$$

$$\begin{cases} \left( \sum_{u=1}^{U} \rho_{u,L}^u(\alpha, w_{u,b}) \mid b = b_u; \sum_{u=1}^{U} w_{u,b} \leq W \right), \; b \in \{b_1, \ldots, b_U\} \\ 0, \quad \text{otherwise} \end{cases}$$

where $0 \leq w_{u,b} \leq W$ and $(b \nmid b_u \Rightarrow (w_{u,b}=0)$. The number of RUs allocated to the user ($w_{u,b}$) may be left to implementation discretion. For the special case of (10) where all the user layers' RUs are considered in evaluating the UPM, the BPM becomes the following weighted sum:

$$\rho_{b,L}(\alpha) = \quad (11)$$

$$\begin{cases} \left( \frac{1}{W} \sum_{u=1}^{U} w_{u,b} \rho_{u,L}^u(\alpha, W) \mid b = b_u; \sum_{u=1}^{U} w_{u,b} \leq W \right), \; b \in \{b_1, \ldots, b_U\} \\ 0, \quad \text{otherwise} \end{cases}$$

According to certain embodiments, one or more DNN beam selectors 125, in conjunction with zero or more non-DNN beam selectors 130, may be used to determine candidate beam selections. As mentioned above, in some embodiments, there may be two architectures of DNN beam selectors, the single-stage beam selector and the multi-stage beam selector.

Figure 3:
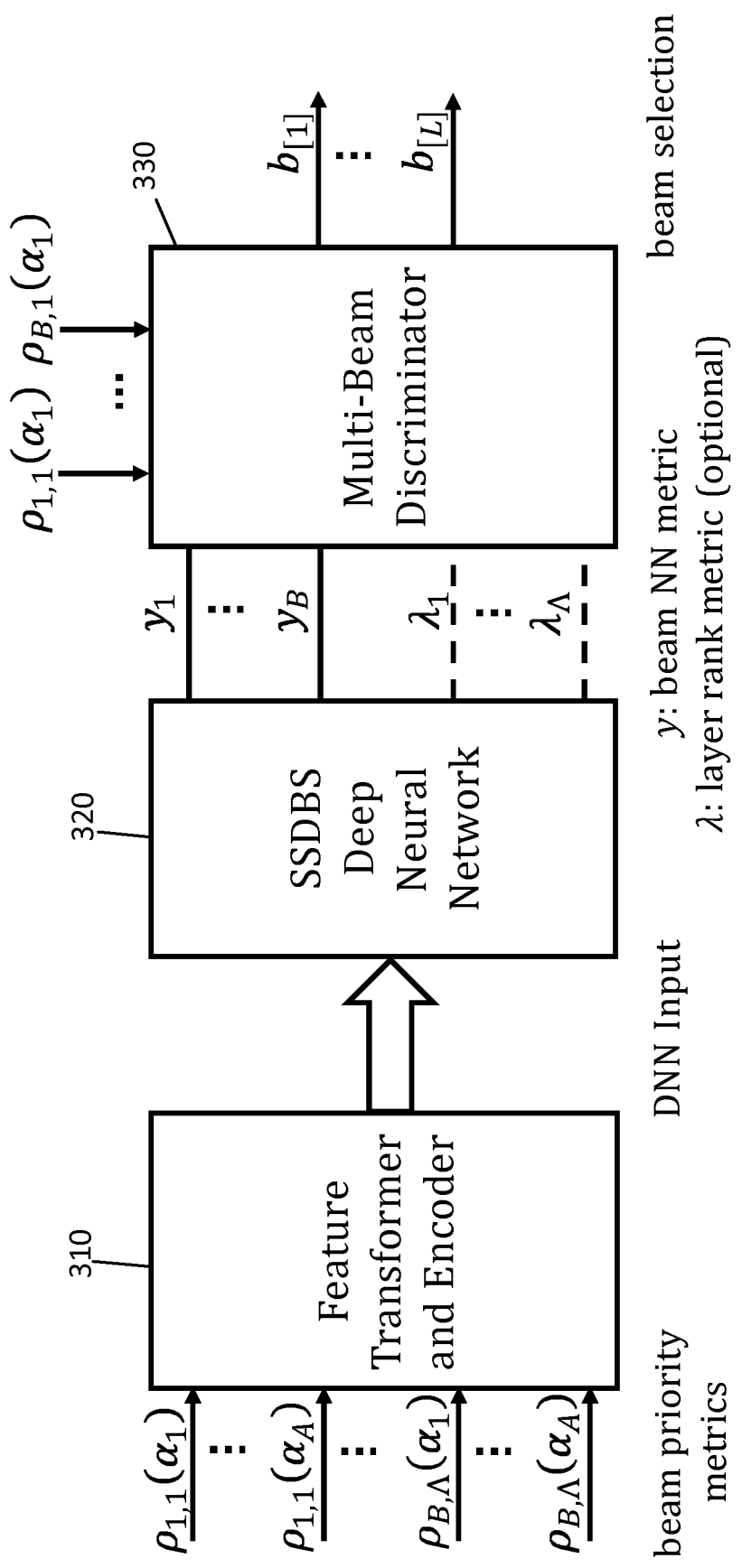
FIG. 3 illustrates an example of a single-stage deep neural network beam selector, according to an embodiment.

FIG. 3 illustrates a block diagram depicting an example of a single-stage DNN beam selector (SSDBS), according to an embodiment. As illustrated in the example of FIG. 3, the SSDBS may be composed of three operational blocks: feature transformer and encoder (FTE) 310, SSDBS deep neural network 320, and multi-beam discriminator (MBD) 330.

In this example, the FTE block 310 may perform mathematical transformations to the BPM input which may include one or more of: scaling, translation, logarithm, exponential, inverse, rectification, compression, etc. The transformed BPMs may then be encoded for use as the DNN input (e.g., one-hot encoder, matrix-to-vector reshaper, etc.). The transformation and encoding is optional and can be left to the implementation specifics.

The SSDBS DNN 320 may output the beam neural network (NN) metrics ($y_1, \ldots, y_B$), which represent either the normalized selection probabilities or the Bellman Q-values of the beams. Optionally, the SSDBS DNN 320 can output the layer rank metric probabilities $\lambda_1, \ldots, \lambda_A$ to indicate the number of user layers that the beam discriminator should select.

Figure 4:
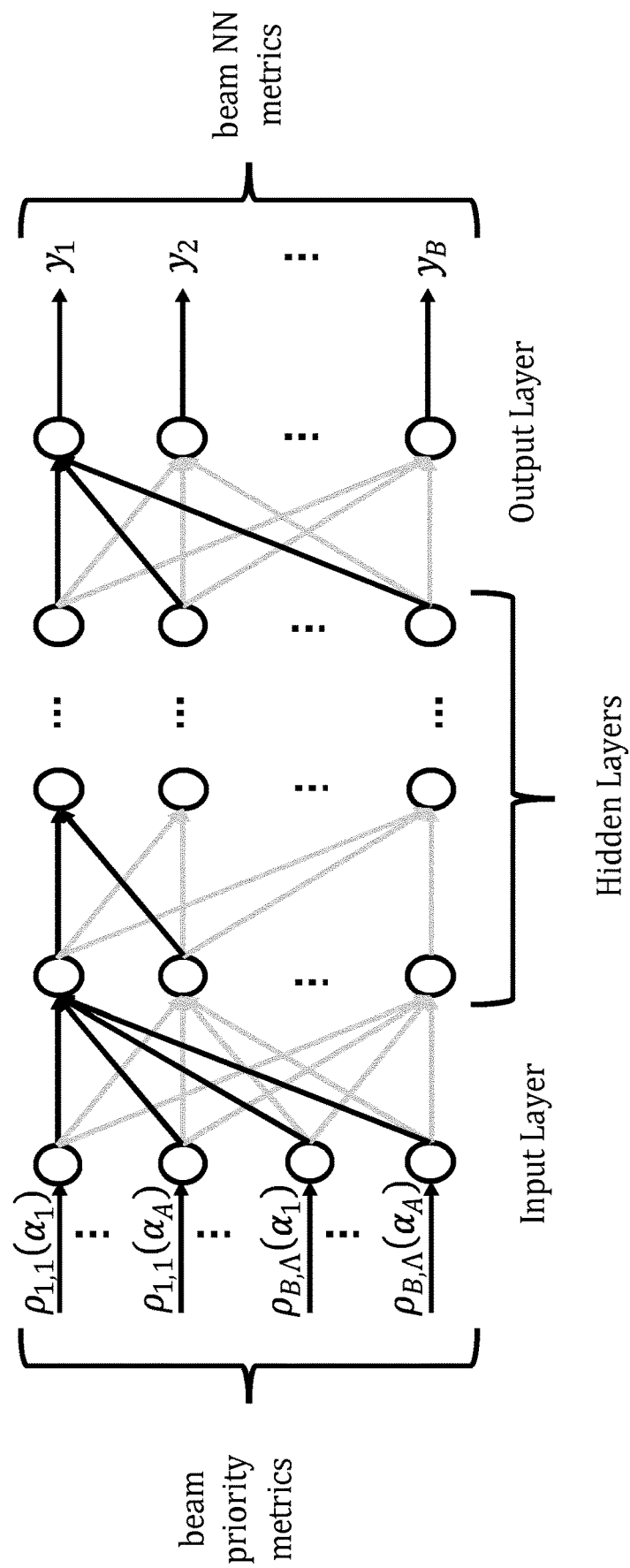
FIG. 4 illustrates an example of a single-stage deep neural network beam selector fully-connected neural network architecture, according to an embodiment.

Examples of the architecture of the SSDBS DNN 320 may include fully-connected NNs, Convolutional NNs (CNN), Recurrent NNs, etc. FIG. 4 illustrates an example of a fully-connected NN case, where the nodes are neurons and the arrows are connections between neurons. Each neuron performs a linear or differentiable non-linear transformation to its input and each connection linearly scales its input.

The MBD 330 may perform the selection of one or more beams from the output of the DNN 320. The MBD 330 may ensure that the layer rank (number of scheduled layers) are valid: $1 \leq L \leq \Lambda$ and that each selected beams has at least one associated user. The discrimination can be threshold based, or based on the Top-N.

For example, threshold-based discrimination may compare the output of DNN 320 to a common threshold to discriminate among beams. Let $d_b \in \{0,1\}$ denote the beam selection flag for the bth beam and $\varepsilon^{select} \in \mathbb{R}$ denote the selection threshold as:

$$d_b^{thresh} \triangleq \begin{cases} 1, & y_b \geq \varepsilon^{select} \\ 0, & \text{otherwise} \end{cases} \quad (12)$$

For instance, top-L discrimination may sort the beams according to the output of DNN 320 in descending order. It may then select the first L beams from the sorted beam list. If the layer rank probabilities are provided by the DNN 320, then $$L = \operatorname*{argmax}_{l} \lambda_L.$$

Otherwise L may be left to discretion.

Figure 5:
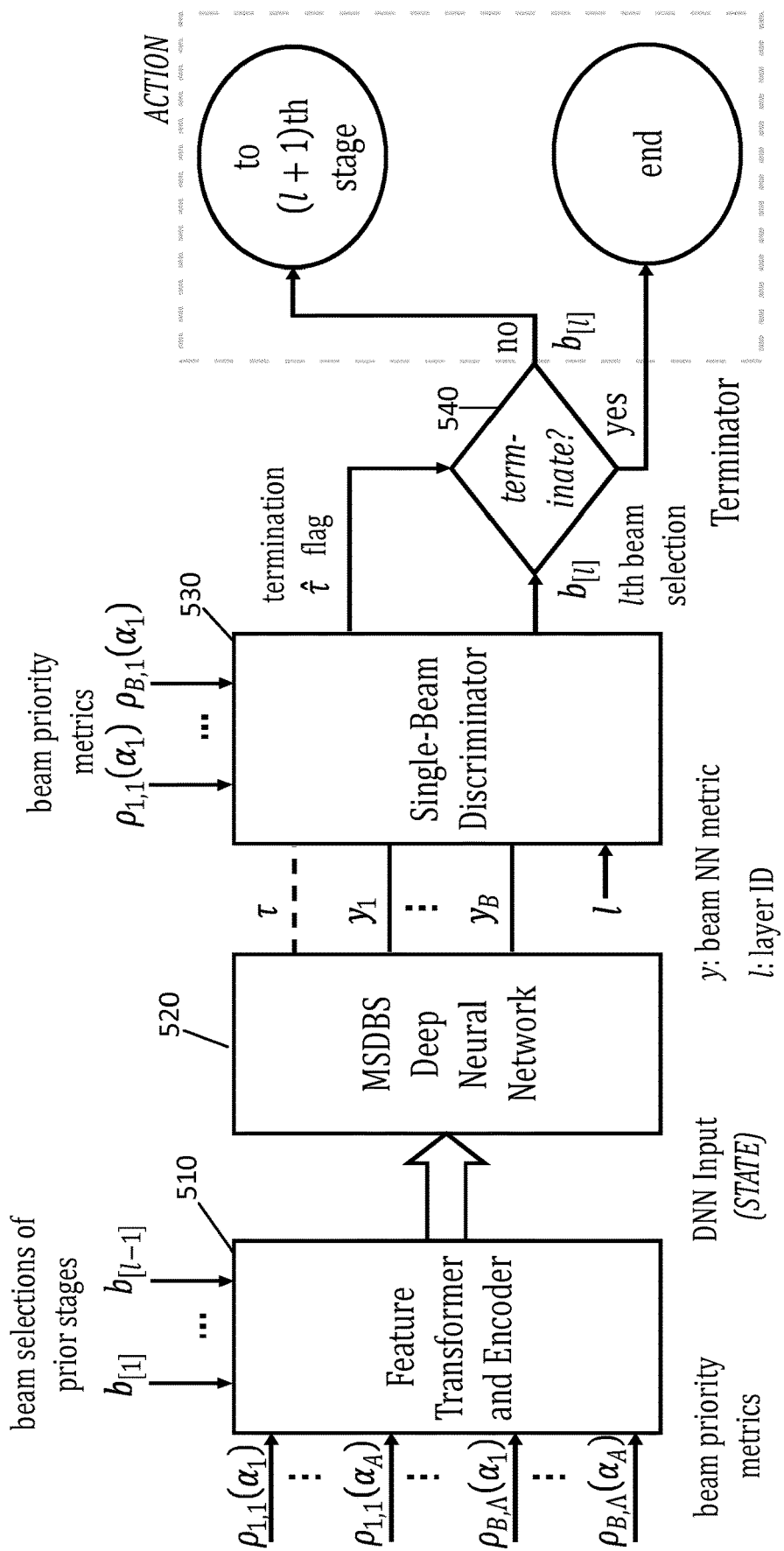
FIG. 5 illustrates an example of a multi-stage deep neural network beam selector, according to an embodiment.

FIG. 5 illustrates a block diagram depicting an example of a multi-stage DNN beam selector (MSDBS), according to an embodiment. The MSDBS may iteratively select the beams, where each stage selects one beam based on already-selected beams of the prior stages. Continuation to the next stage depends on the DNN outputs.

As illustrated in the example of FIG. 5, the MSDBS may be composed of four operational blocks: feature transformer and encoder (FTE) 510, MSDBS DNN 520, Single-beam discriminator (SBD) 530, and terminator 540.

The FTE block 510 may perform mathematical transformations to the BPM input which may include one or more of the following: scaling, translation, logarithm, exponential, inverse, rectification, compression, etc. The transformed BPMs may then be encoded for use as the DNN input (e.g., one-hot encoder, matrix-to-vector reshaper, etc). The transformation and encoding is optional and may be left to discretion.

Similar to that of the SSDBS, the MSDBS DNN 520 may output the beam NN metrics $(y_1, \ldots, y_B)$, which represent either the normalized selection probabilities or the Bellman Q-values of the beams. Optionally, the DNN may have a dedicated output for the termination probability $\tau$. The DNN architecture may be left to discretion. Examples of the DNN architecture may include fully-connected NNs, Convolutional NNs (CNN), Recurrent NNs, etc. In addition, the training methodology and hyper-parameters may be left to discretion. Training may be via Reinforcement Learning or Supervised Learning, for example.

Figure 6:
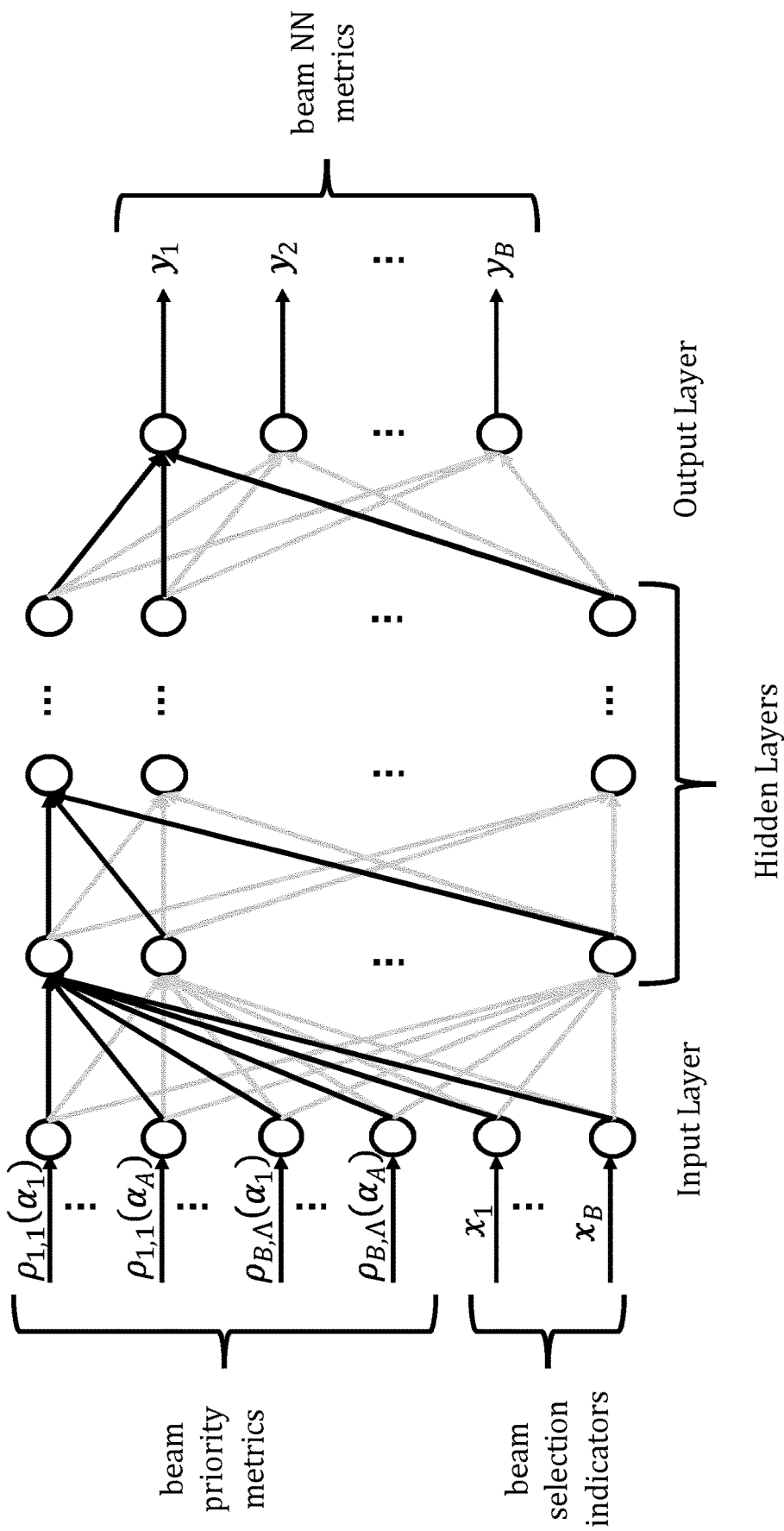
FIG. 6 illustrates an example of a multi-stage deep neural network beam selector fully-connected neural network architecture, according to an embodiment.

FIG. 6 illustrates an example of a MSDBS fully-connected NN case, according to an embodiment. In the example of FIG. 6, the nodes are neurons and the arrows are connections. In the model of FIG. 6, the set of prior-selected beams $(b_{[l]})$, are encoded as the ordered set of beam selection indicators, $x_1, \ldots, x_B$, where $C_1$ and $C_0$ are arbitrary constants:

$$x_b \triangleq \begin{cases} C_1, & b \in \{b_1, \ldots, b_{[l-1]}\} \\ C_0, & \text{otherwise} \end{cases} \quad (13)$$

The SBD 530 may perform the selection of a single beam or no beam from the DNN output. The SBD 530 may ensure that the layer rank is valid: $1 \le \Lambda$ and that the selected beam has at least one associated user. Optionally, after the selection the single beam, beams which cause high cross-beam-interference to the selected beam (a.k.a. nearby beams) may be discarded from possible selection at future stages by zeroing-out their BPMs in future stages or by alternative means.

A beam may be selected if its NN metric is the maximum and the NN metric satisfies a threshold. The beam selection indicator for the bth beam is $d_b^{thresh}$ is given by:

$$d_b^{thresh} \triangleq \begin{cases} 1, & \left(b = \operatorname*{argmax}_b y_b \middle| (y_b \ge \varepsilon^{select}) \text{ and } (\rho_{b,1}(\alpha_1) > 0) \text{ and } (b \notin \{b_{[1]}, \ldots \\ 0, & \text{otherwise} \end{cases} \quad (14)$$

The flagged indicator provides the selected beam for that stage: $(d_b^{thresh}=1) \Rightarrow (b_{[l]}=b)$. If a termination probability is provided by the MSDBS DNN 520, a threshold may be used to determine ON/OFF condition of the termination flag $\hat{\tau} \in \{0,1\}$:

$$\hat{\tau} = \begin{cases} 1, & (\tau \ge \varepsilon^{term}) \text{ or } (l-\Lambda) \\ 0, & \text{otherwise} \end{cases} \quad (15)$$

where $\varepsilon^{term}$ is the termination flag threshold. Alternatively, in parallel to beam selection, the SBD calculates the termination flag as a function of the other outputs and the layer index: $\hat{\tau}=F(y_1, \ldots, y_B, l)$.

$$\hat{\tau}=F(y_1, \ldots, y_B, l). \quad (16)$$

One example termination condition is when all the beam selection indicators are zero or when the maximum number of user layers has been reached:

$$\hat{\tau} = \begin{cases} 1, & \left(d_b^{thresh} = 0, \forall b\right) \text{ or } (l-\Lambda) \\ 0, & \text{otherwise} \end{cases} \quad (17)$$

The terminator 540 may determine whether to proceed to the next stage to add another layer, based on the value of the termination flag. When $\hat{\tau}=1$, the terminator ends the MSDBS iteration at the current stage. Otherwise, the MSDBS continues to the next stage and provides that stage with the selected beam by the current stage.

According to certain embodiments, the BBSE 140 may be used to find the final beam selection from among the candidate beam selections provided by two or more beam selectors 125, 130 via an arbitrary selection criterion.

One selection criterion is the max-sum-priority metric, which maximizes the sum PM (SPM), defined as:

$$\Phi_\delta \triangleq \sum_{l=1}^{L_\delta} \rho_{b_{[l]}^\delta, L_\delta}(\alpha(\{\backslash [l]\})), \quad (18)$$

where $\alpha(\{\backslash [l]\})$ denote the TCBI of the other co-scheduled beams to the beam at the lth layer, and $\rho_{b_{[l]}^\delta, L_\delta}(\alpha(\ldots))$ is the BPM of that beam as a function of the TCBI and the number of co-scheduled beams. The final beam selections $\delta^*=\{b_{[1]}^*, \ldots, b_{[L]}^*\}$ are the selections which maximizes the SPM:

$$\delta^* \triangleq \operatorname*{argmax}_\delta \Phi_\delta. \quad (19)$$

The user selector 150 may determine the set of users from the final beam selection by either discarding the un-associated users or selecting the best user of each beam. In some use cases, the scheduler may provide the user pairing from the final beam selection, wherein there is a single user assigned for the beam. For this case, the lth paired user ($u_l^*$) is the PM-maximizing user of the lth beam:

$$u_l^* \triangleq \operatorname*{argmax}_{u} \rho_{u,L}^u(\alpha, w_u = W) \Big|_{b_u = b_{[l]}^*}. \tag{20}$$

If the PM-maximizing user is selected for each beam, then the SPM is equal to the MU-PM of the beam selection. In other use cases, such as when multiple users may be simultaneously allocated for the beam, the user selector simply discards the un-associated users. Letting $z_u^*$ denote the selection of a user as part of the filtered candidate set:

$$z_u^* = \begin{cases} 1, & b_u \in \{b_{[1]}^1, \ldots, b_{[L]}^1\} \\ 0, & \text{otherwise} \end{cases}. \tag{21}$$

Finally, the user may be selected for scheduling when $z_u$=1 and $w_u$>0.

For the SSDBS and MSDBS, certain embodiments may implement a specific class of Neural Networks called Deep Q Networks (DQN). When training these networks, the output they produce is a set of Q values:

$$Q(s, a) = r(s, a) + \gamma \max_{a'} Q(s'(s, a), a') \tag{22}$$

Equation (22) is known as the Bellman equation where γ is the future discount factor. It computes a Q value depending on the state s the system is at, and action a taken in state s. Q value represents a future reward that is observed when taking action a and it is equal to the sum of the immediate reward r(s, a) and potential maximum future reward $$\max_{a'} Q(s'(s, a), a')$$

of the state s' to which the system will transition assuming action α is taken.

In an embodiment, the state s is defined as the matrix of BPM for a predefined set of TCBI $\alpha = \alpha_1, \ldots, \alpha_A$, and a vector of beam selection indicators x as defined in formula (13).

$$s \triangleq \{\rho_{1,1}(\alpha_1), \ldots, \rho_{1,1}(\alpha_A), \ldots, \rho_{B,\Lambda}(\alpha_1), \ldots, \rho_{B,\Lambda}(\alpha_A), x_1, \ldots, x_B\} \tag{23}$$

Action a corresponds to selecting the bth beam in state s, and the reward r is the net increase in SPM for selecting the bth beam in state s:

$$r(s,b) \triangleq \Phi_{\{b_{[1]}, \ldots, b_{[l-1]}, B\}} - \Phi_{\{b_{[1]}, \ldots, b_{[b-1]}\}}. \tag{24}$$

In (24), the first term is the sum priority metric for the prior-selected beams together with the bth beam selected for the lth user layer. The second term is the SPM for the prior-selected beams only. SPM is elaborated in (17).

Assuming γ=1, from (23) and (24), we find that Q represents the potential maximum SPM provided by adding the bth beam, conditioned on the prior beam selections:

$$Q(s, b) \triangleq \max_{\{b_{[l+1]}, \ldots, b_{[L]}\}} [\Phi_{b_{[1]}, \ldots, b, \ldots, b_{[L]}\}} - \Phi_{b_{[1]}, \ldots, b_{[l+1]}\}}], \tag{25}$$

where L≤Λ, and $\{b_{[l+1]}, \ldots, b_{[L]}\}$ is the set of future beam selections.

During DNN training, the MSDBS DNN or SSDBS DNN uses the Q values as the target output:

$$\hat{y}_b(s) = Q(s,b). \tag{26}$$

A special case of r is for the initial state $s_0$, wherein there are no prior-selected beams ($s_0$={ }) and the first beam is to be selected. At the initial state, the reward for selecting the bth beam is the CBI-free BPM of that beam:

$$r(s_0,b) = \rho_{b,1}(\alpha=0). \tag{27}$$

Similarly, a special case for Q is at the initial state:

$$Q(s_0, b) = \max_{\{b_{[2]}, \ldots, b_{[L]}\}} [\Phi_{b, b_{[2]}, \ldots, b_{[L]}\}}], \tag{28}$$

which represents the maximum. SPM for all beam selections given that the bth beam is selected. Consequently, for all the beams of the SPM-maximizing beam selection $\{b^\dagger\}$, their Qs are equal to the maximum Q:

$$Q(s_0, b \in \{b^\dagger\}) = Q(s_0, k \in \{b^\dagger\}) = \max_m Q(s_0, m). \tag{29}$$

Through formula (29), an SSDBS whose DNN encodes the Qs at the initial state could be used to determine the set of SPM-maximizing beams in a single step, since their Qs should be greater than the Qs of the rest of the beams.

Alternatively, to possibly increase the selection accuracy under a practical DNN, an MSDBS-based beam discrimination with one-beam-at-a-time selection may be performed. With MSDBS, one or more DNNs encode the Qs for l≤1, . . . , Λ, and the SBD determines the Q-maximizing beam at the lth layer from the rest.

To obtain the optimal Q-function in (22), a value iteration for all states s and actions a may be conducted. This target/optimal Q-function can then be estimated using a machine learning approach, such as DQN. In practice, the Q-function may be obtained/estimated by conducting the value iteration and approximation simultaneously as following.

Certain embodiments may define state s to include a list of prior-selected beams, as formulated in (23), and use this along with the ordered list of BPMs as input to train DQN. Example embodiments may define action a to be the beam selection b in state s. In this case, the set of Q values (target output of the DQN Neural Network) for each state will correspond to the maximum partial SPM of selecting beam b in state s (25).

An embodiment provides DQN Neural Network Training Sample Generation. It may be important to train. DQN network with the right training samples. If not trained properly the network might not converge to a useful state, and the output of the network will not produce Q values as defined by (22).

Several policies may be used to create training samples. For example, the policies may include an exhaustive search policy, multi-user greedy policy, CBI-free greedy policy, or random-greedy hybrid policy. In an exhaustive search policy, training samples are generated using exhaustive search of all beam combinations that produce maximum sum of BPMs as defined in (18). In a multi-user greedy policy, the training samples are generated by looking at which action α in state s will produce the highest reward r where r is defined in (24). In a CBI-free greedy policy, training samples are produced by taking actions that would maximize sum of UPMs, assuming no cross-beam interference in calculating the UPMs. However, beams with high CBI from those beams already selected may be discarded. In a random-greedy hybrid policy, the first j-tuples may be randomly selected followed with a greedy scheme for the remaining user layers to keep the total combinations in a manageable range.

Once training samples are generated, they may be divided into mini-batches, and DQN is incrementally trained with these mini-batches. The size of the mini-batches may be configurable.

Figure 7:
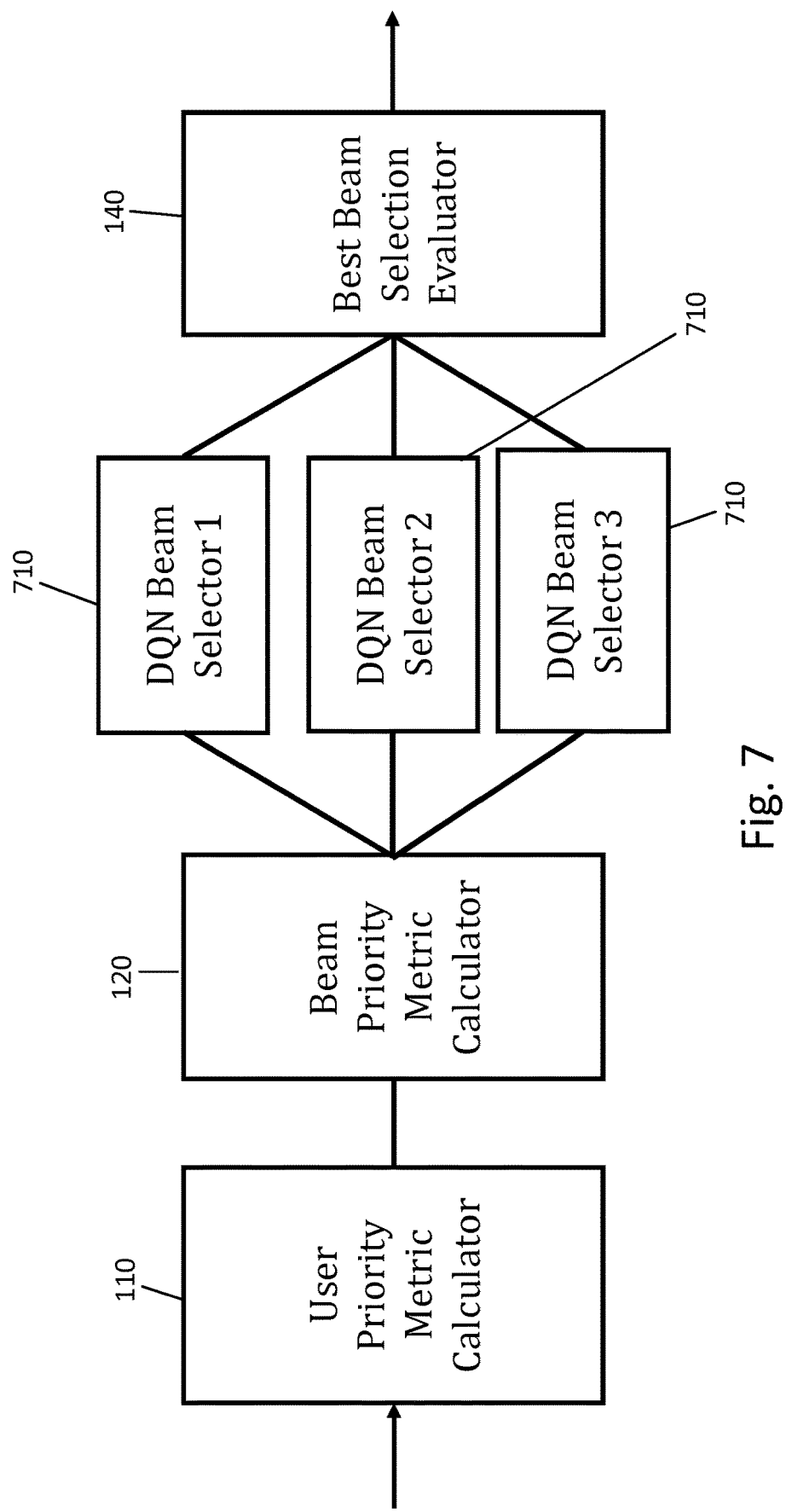
FIG. 7 illustrates an example block diagram of a N deep-Q network (DQN) solution, according to an embodiment.

FIG. 7 illustrates an example block diagram of a N-DQN solution. In some embodiments, multiple DQN may be trained and, in this case, the output that maximizes a utility metric (e.g., a metric as defined in (17)) can be selected. In this way, diversity across multiple DQNs may be achieved by a DQN beam selector 710 selecting the output of the DQN that gives the best beam combination. The best beam combination is the one that maximizes a predefined utility metric. This may be applicable to both single stage and multistage Beam Selector Neural Network implementations.

Figure 8:
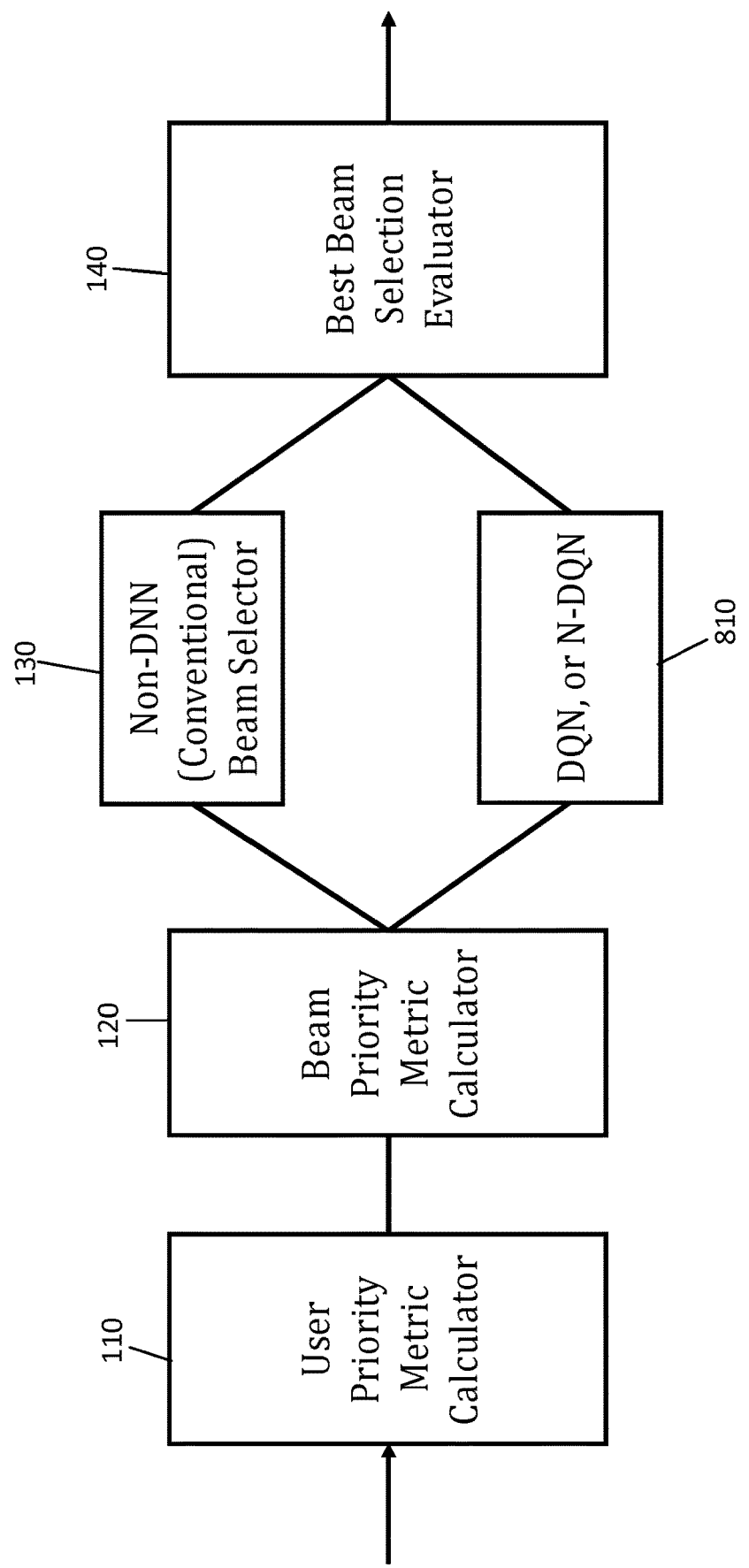
FIG. 8 illustrates an example block diagram of a Hybrid DQN solution (H-DQN), according to an embodiment.

FIG. 8 illustrates an example block diagram of a Hybrid DQN solution (H-DQN). According to this embodiment, the output of the conventionally obtained beam combination can be combined with the one obtained by a DQN or N-DQN solution 810. Conventionally obtained beam combination is usually suboptimal, due to computational complexity of the exhaustive search algorithm. However, a Neural Network can be trained to mimic exhaustive search and obtain beam combination that would maximize a predefined utility metric. Further, the benefit of combining conventional algorithm with the DQN is that it provides safety net for the case when DQN output gives suboptimal or poor beam combination.

Figure 9:
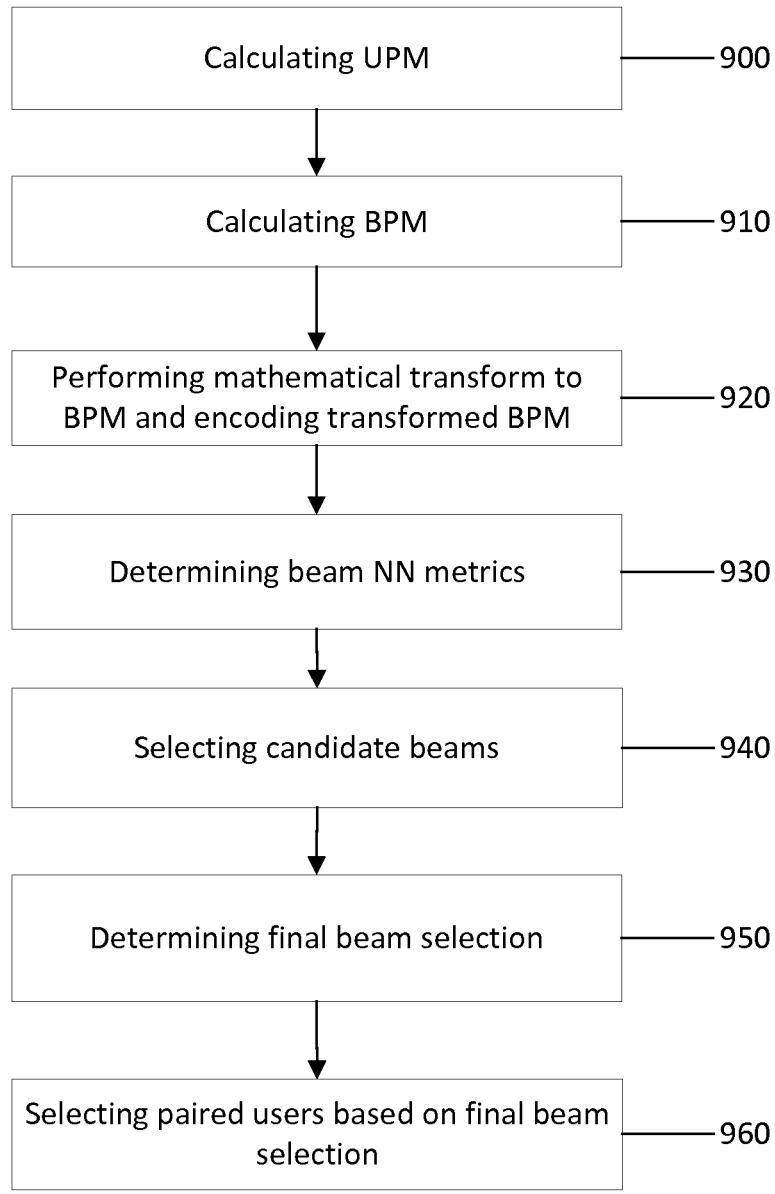
FIG. 9 illustrates an example flow diagram of a method, according to an embodiment.

FIG. 9 illustrates an example flow diagram of a method for selecting paired users in a MU-MIMO system, according to one example embodiment. In certain example embodiments, the flow diagram of FIG. 9 may be performed by a network node, such as a base station, node B, eNB, gNB, or any other access node, or one or more servers in a cloud configuration. Certain embodiments may be configured to perform a method as executed by the system of FIGS. 1 and 2 discussed in detail above. In some embodiments, the method may include selecting MU-MIMO candidate beams using DNNs, and selecting paired users based on the selected candidate beams. In an embodiment, the DNNs may be trained to maximize MU-PM or a heuristic of the MU-PM.

More specifically, as illustrated in the example of FIG. 9, the method may include, at 900, calculating a UPM representing a relative priority of a user in scheduling. In certain embodiments, the UPM for the uth user $(\rho_{u,L}{}^u(\alpha))$ is a function of the user CSI ($\tau$), the user QoS metric $\kappa$, the user average throughput ($r^{ave}$), the TCBI ($\sigma$), the power splitting factor $\psi_L$ based on the number of co-scheduled users, and the number of resource units allocated to the user ($w_u$).

According to an embodiment, the UPM for the uth user $(\rho_{u,L}{}^u(\alpha))$ may be calculated according to equation (1) discussed above.

In an embodiment, the method may then include, at 910, calculating a BPM using at least the UPM. According to some embodiments, the calculating 910 may include calculating the BPM for each combination of beam ID b=1, ..., B samples of TCBI $\alpha=\alpha_1, \ldots, \alpha_A$ and, if under dynamic power splitting, the number of co-scheduled user layers. In certain embodiments, the BPM may be calculated according to one or more of equations (9), (10), or (11) discussed above.

According to certain embodiments, the method may also include, at 920, performing mathematical transformations to the BPM and encoding the transformed BPM. For example, the mathematical transformation may include one or more of scaling, translation, logarithm, exponential, inverse, rectification, compression, etc. As an example, the encoding may include one-hot encoding, matrix-to-vector reshaping, etc. The method may then include, at 930, determining beam NN metrics that represent at least one of normalized selection probabilities and/or Q-values of a Bellman equation, using the encoded beam priority metric. Optionally, the method may include determining layer rank metric probabilities to indicate the number of user layers that should be selected. In some embodiments, the method may further include, at 940, selecting the candidate beams using DNNs. According to certain embodiments, the DNNs may include fully-connected NNs, convolutional NNs, recurrent NNs, etc.

According to an embodiment, the selecting 940 may include selecting at least one beam based on the beam NN metrics. For example, in one embodiment, the selecting 940 may include selecting, by a single-stage DNN beam selector, the candidate beams simultaneously through a single pass of the DNN. In certain embodiments, the selecting of the at least one beam may include comparing the beam NN metrics with a common threshold to discriminate among beams. For example, $d_b \in \{0,1\}$ may denote the beam selection flag for the kith beam and $\varepsilon^{select} \in \mathbb{R}$ denote the selection threshold as:

$$d_b^{thresh} \triangleq \begin{cases} 1, & y_b \geq \varepsilon^{select} \\ 0, & \text{otherwise} \end{cases}.$$

In other embodiments, the selecting of the at least one beam may include sorting the beams according to the beam NN metrics and selecting the first L beams from the list of sorted beams. In an embodiment, when the layer rank probabilities are provided, then $$L = \operatorname*{argmax}_l \lambda_l;$$

otherwise the number of beams L to select may be left up to the implementation.

According to another embodiment, the selecting 940 may include selecting zero or one beam based on the beam NN metrics. For example, in one embodiment, the selecting 940 may include selecting, by a multi-stage DNN beam selector, one beam at a time for each stage. In some embodiments, after selecting the zero or one beam, discarding, from selection at future stages, other beams that cause high cross-beam interference to the selected zero or one beam. In some embodiments, the selecting 940 may include selecting a beam if its NN metric is the maximum and the NN metric satisfies a threshold.

According to an embodiment, the method may also include determining whether to proceed to a next stage to add another layer based on a value of a termination flag. Also, in some embodiments, the selecting 940 may include ensuring that the layer rank is valid and the selected beam has at least one associated user.

In certain embodiments, the method may include, at 950, determining a final beam selection from among the candidate beam selections via a selection criterion. For example, the selection criteria may include the max-sum-priority metric, which maximizes the sum PM (SPM), defined as:

$$\Phi_\delta \triangleq \sum_{l=1}^{L_\delta} \rho_{b_{[l]}^\delta, L_\delta}^u (\alpha(\{\backslash[l]\})), \qquad (18)$$

where $\alpha(\{\backslash[l]\})$ denote the TCBI of the other co-scheduled beams to the beam at the lth layer, and $\rho_{b_{[l]}^\delta, L_\delta}(\alpha(\ldots))$ is the BPM of that beam as a function of the TCBI and the number of co-scheduled beams. The final beam selections $\delta^{*\prime} = \{b_{[1]}^*, \ldots, b_{[L]}^*\}$ may be the selections which maximizes the SPM:

$$\delta^* \triangleq \underset{\delta}{\mathrm{argmax}} \Phi_\delta. \qquad (19)$$

According to an embodiment, the method may include, at 960, selecting the paired users based on the final beam selection. In one embodiment, the selecting 960 may include determining a set of users from the final beam selection by at least one of discarding un-associated users or selecting a best user of each beam. In certain embodiments, when the user pairing from the final beam selection is provided and there is a single user assigned for the selected beam, the lth paired user ($u_l^*$) is the PM-maximizing user of the lth beam:

$$u_l^* \triangleq \underset{u}{\mathrm{argmax}} \rho_{u,L}^u(\alpha, w_u = W) \bigg| b_u = b_{[l]}^*. \qquad (20)$$

In this case, the selecting 960 may include selecting the PM-maximizing user for each beam, and then the SPM is equal to the MU-PM of the beam selection. In other examples, such as when multiple users may be simultaneously allocated for the beam, the selecting 960 may include discarding the un-associated users. The method may also include scheduling the selected user(s). In an embodiment, if $z_u^*$ denotes the selection of a user as part of the filtered candidate set:

$$z_u^* = \begin{cases} 1, & b_u \in \{b_{[1]}^*, \ldots, b_{[L]}^*\} \\ 0, & \text{otherwise} \end{cases}. \qquad (21)$$

Then the selecting 960 may include selecting the user for scheduling when $z_u^*=1$ and $w_u>0$. In certain embodiments, the method may also include storing one or more of the final beam selection, selected user and/or user pairs in volatile or non-volatile memory, for example. According to an embodiment, the method may also include transmitting on the final beam selection and/or to the selected user pair(s).

Figure 10:
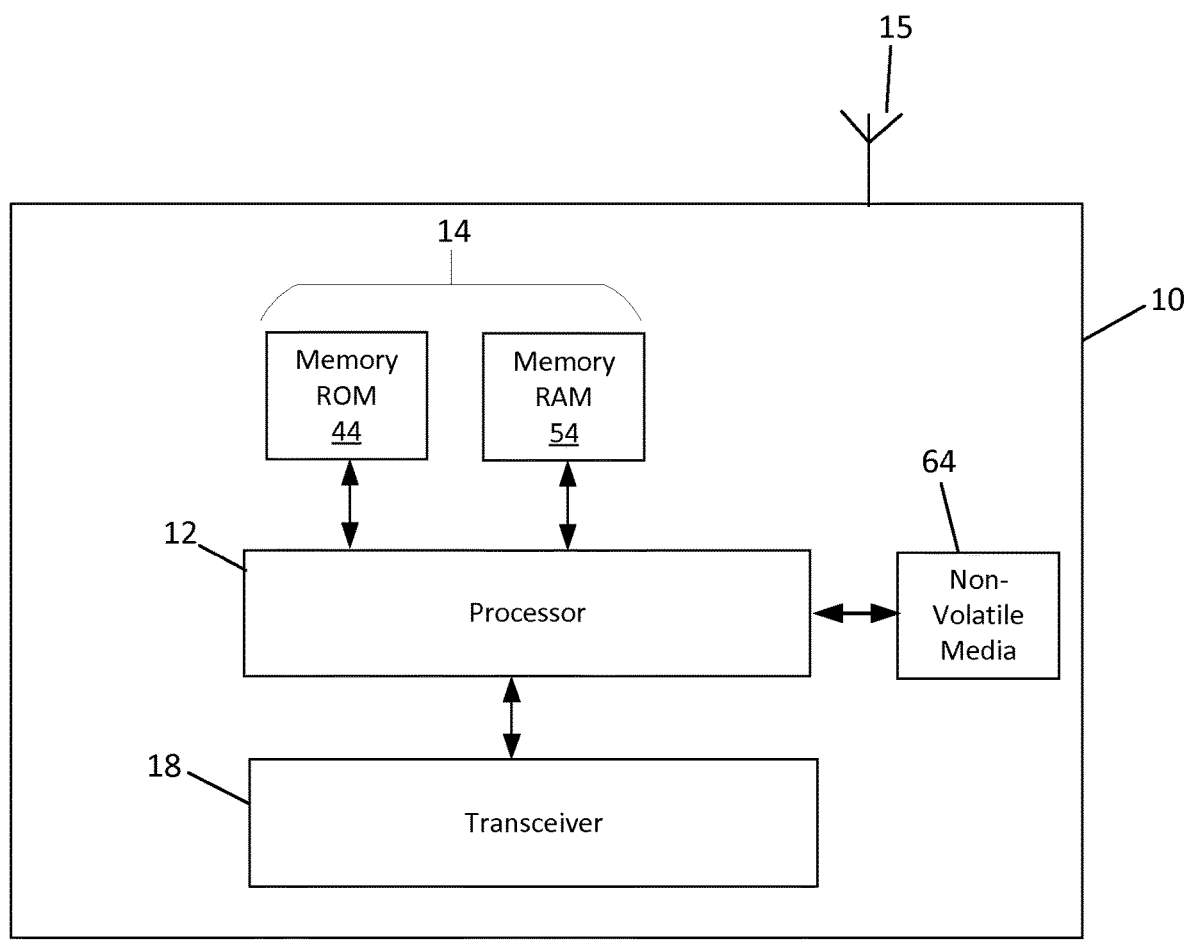
FIG. 10 illustrates an example block diagram of an apparatus, according to an embodiment.

FIG. 10 illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10.

As illustrated in the example of FIG. 10, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to at least one memory 14 (internal or external), which may be coupled to processor 12, for storing information and instructions that may be executed by processor 12. Memory 14 may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, memory 14 can be comprised of any combination of random access memory (RAM) 54, read only memory (ROM) 44, non-volatile memory, static storage such as a magnetic or optical disk, hard disk drive (HDD), or any other type of non-transitory machine or computer readable media. For example, in an embodiment, apparatus 10 may include a non-volatile media 64. In an embodiment, non-volatile media 64 may be a removable media. Memory 14 and/or media 64 may store software, computer program code or instructions. The instructions stored in memory 14 or media 64 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. According to example embodiments, apparatus 10 may be controlled by memory 14 and processor 12 to perform the functions associated with any of the example embodiments described herein, such as the flow diagram illustrated in FIG. 9. Additionally, in certain embodiments, apparatus 10 may include or implement the systems illustrated in FIGS. 1-8. In example embodiments, for instance, apparatus 10 may be configured to perform a process for selecting paired users in a MU-MIMO system.

For instance, in some example embodiments, apparatus 10 may be controlled by memory 14 and processor 12 to select MU-MIMO candidate beams using DNNs, and to select paired users based on the selected candidate beams. In an embodiment, the DNNs may be trained to maximize MU-PM or a heuristic of the MU-PM.

More specifically, in an embodiment, apparatus 10 may be controlled by memory 14 and processor 12 to calculate a UPM representing a relative priority of a user in scheduling. In certain embodiments, the UPM for the uth user ($\rho_{u,L}^u(\alpha)$) is a function of the user CSI ($\sigma$), the user QoS metric $\kappa$, the user average throughput ($r^{ave}$), the TCBI ($\alpha$), the power splitting factor $\psi_L$ based on the number of co-scheduled users, and the number of resource units allocated to the user ($w_u$). According to an embodiment, the UPM for the with user ($\rho_{u,L}^u(\alpha)$) may be calculated according to equation (1) discussed above.

In an embodiment, apparatus 10 may be controlled by memory 14 and processor 12 to calculate a BPM using at least the UPM. According to some embodiments, apparatus 10 may be controlled by memory 14 and processor 12 to calculate the BPM for each combination of beam ID b=1, . . . , B samples of TCBI $\alpha=\alpha_1, \ldots, \alpha_A$ and, if under dynamic power splitting, the number of co-scheduled user layers. In certain embodiments, the BPM may be calculated according to one or more of equations (9), (10), or (11) discussed above.

According to certain embodiments, apparatus 10 may be controlled by memory 14 and processor 12 to perform mathematical transformations to the BPM and encode the transformed BPM. In an embodiment, apparatus 10 may be controlled by memory 14 and processor 12 to determine beam NN metrics that represent at least one of normalized selection probabilities and/or Q-values of a Bellman equation, using the encoded beam priority metric. Optionally, apparatus 10 may be controlled by memory 14 and processor 12 to determine layer rank metric probabilities to indicate the number of user layers that should be selected. In some embodiments, apparatus 10 may be controlled by memory 14 and processor 12 to select the candidate beams using DNNs. According to certain embodiments, the DNNs may include fully-connected NNs, convolutional NNs, recurrent NNs, etc.

According to an embodiment, apparatus 10 may be controlled by memory 14 and processor 12 to select at least one beam based on the beam NN metrics. For example, in one embodiment, apparatus 10 may be controlled by memory 14 and processor 12 to select the candidate beams simultaneously through a single pass of the DNN. In certain embodiments, apparatus 10 may be controlled by memory 14 and processor 12 to compare the beam NN metrics with a common threshold to discriminate among beams. For example, $d_b \in \{0,1\}$ may denote the beam selection flag for the bth beam and $\varepsilon^{select} \in \mathbb{R}$ denote the selection threshold as:

$$d_b^{thresh} \triangleq \begin{cases} 1, & y_b \geq \varepsilon^{select} \\ 0, & \text{otherwise} \end{cases}.$$

In other embodiments, apparatus 10 may be controlled by memory 14 and processor 12 to sort the beams according to the beam NN metrics to form a sorted list of beams, and to select the first L beams from the list of sorted beams. In an embodiment, when the layer rank probabilities are provided, then $$L = \operatorname*{argmax}_l \lambda_l;$$

otherwise me number of beams L to select may be left up to the implementation.

According to another embodiment, apparatus 10 may be controlled by memory 14 and processor 12 to select zero or one beam based on the beam NN metrics. For example, in one embodiment, apparatus 10 may be controlled by memory 14 and processor 12 to select one beam at a time for each stage. In some embodiments, after selecting the zero or one beam, apparatus 10 may be controlled by memory 14 and processor 12 to discard, from selection at future stages, other beams that cause high cross-beam interference to the selected zero or one beam. In some embodiments, apparatus 10 may be controlled by memory 14 and processor 12 to select a beam if its NN metric is the maximum and the NN metric satisfies a threshold.

According to an embodiment, apparatus 10 may be controlled by memory 14 and processor 12 to determine whether to proceed to a next stage to add another layer based on a value of a termination flag. Also, in some embodiments, apparatus 10 may be controlled by memory 14 and processor 12 to ensure that the layer rank is valid and the selected beam has at least one associated user.

In certain embodiments, apparatus 10 may be controlled by memory 14 and processor 12 to determine a final beam selection from among the candidate beam selections via a selection criterion. For example, the selection criteria may include the max-sum-priority metric that maximizes the sum PM (SPM), as defined in formula (18) discussed above. The final beam selections may be the selections which maximizes the SPM as defined in formula (19) discussed above.

According to an embodiment, apparatus 10 may be controlled by memory 14 and processor 12 to select the paired users based on the final beam selection. In one embodiment, apparatus 10 may be controlled by memory 14 and processor 12 to determine a set of users from the final beam selection by at least one of discarding un-associated users or selecting a best user of each beam. In certain embodiments, apparatus 10 may be controlled by memory 14 and processor 12 to select the PM-maximizing user for each beam. In other examples, such as when multiple users may be simultaneously allocated for the beam, apparatus 10 may be controlled by memory 14 and processor 12 to discard the un-associated users. In an embodiment, apparatus 10 may be controlled by memory 14 and processor 12 to select the user for scheduling based on the result of equation (21) discussed above. According to certain embodiments, apparatus 10 may be controlled by memory 14 and processor 12 to schedule the selected user(s). In some embodiments, apparatus 10 may be controlled by memory 14 and processor 12 to store one or more of the final beam selection, selected user and/or user pairs in volatile or non-volatile memory, for example. In an embodiment, apparatus 10 may be controlled by memory 14 and processor 12 to transmit on the final beam selection and/or to the selected user pair(s).

Therefore, certain example embodiments provide several technical improvements, enhancements, and/or advantages. For example, certain embodiments provide methods to quickly and efficiently calculate a MU-MIMO beam selection and user pairing that can outperform conventional heuristic and combinatorial search schemes. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. A method, comprising:
   selecting multi-user multiple input multiple output candidate beams using one or more deep neural networks;
   selecting, by a single-stage deep neural network beam selector, the candidate beams simultaneously through a single pass of the deep neural network; and
   selecting paired users based on the selected beams,
   wherein the one or more deep neural networks are trained to maximize a multi-user priority metric or a heuristic of the multi-user priority metric.

2. The method according to claim 1, wherein the selecting of the candidate beams comprises:
   selecting, by a multi-stage deep neural network beam selector, one beam at a time for each stage.

3. The method according to claim 1, further comprising:
   calculating a user priority metric representing a relative priority of a user in scheduling;
   calculating a beam priority metric using at least the user priority metric; performing mathematical transformations to the beam priority metric; and
   encoding the transformed beam priority metric.

4. The method according to claim 3, further comprising:
   determining beam neural network metrics that represent at least one of normalized selection probabilities or Q-values of a Bellman equation, using the encoded beam priority metric, wherein the selecting of the candidate beams further comprises:
   selecting at least one beam based on the beam neural network metrics, wherein the selecting of the at least one beam further comprises comparing the beam neural network metrics with a common threshold to discriminate among beams.

5. The method according to claim 4, wherein the selecting of the at least one beam further comprises sorting the beams according to the beam neural network metrics and selecting first L beams from the sorted beams.

6. The method according to claim 4, wherein the selecting of the candidate beams further comprises after selecting said at least one beam, discarding, from selection at future stages, other beams that cause high cross-beam interference to said selected at least one beam.

7. The method according to claim 1, further comprising:
   determining a final beam selection from among the candidate beam selections via a selection criterion,
   wherein the selecting of the paired users comprises determining a set of users from the final beam selection by at least one of discarding un-associated users or selecting a best user of each beam.

8. The method according to claim 1, wherein:
   said selecting of the candidate beams further comprises producing N beam combinations using the one or more deep neural networks; and
   selecting, from the N beam combinations, a single beam combination that produces maximum utility.

9. The method according to claim 1, wherein:
   said selecting of the candidate beams further comprises producing N beam combinations using the one or more deep neural networks and producing zero or more beam combinations using methods not involving a deep neural network; and
   selecting, from among the N beam combinations and the zero or more combinations produced by methods not involving a deep neural network, a single beam combination that produces maximum utility.

10. The method according to claim 1, further comprising:
    training the one or more deep neural networks with training samples, wherein at least one of the following policies are used to create the training samples: exhaustive search policy, multi-user greedy policy, crossbeam interference free greedy policy, or random greedy hybrid policy.

11. An apparatus, comprising:
    at least one processor; and
    at least one non-transitory memory storing instructions that, when executed by the at least one processor, cause the apparatus at least to:
    select multi-user multiple input multiple output candidate beams using one or more deep neural networks;
    select the candidate beams simultaneously through a single pass of the deep neural network; and
    select paired users based on the selected beams,
    wherein the one or more deep neural networks are trained to maximize a multi-user priority metric or a heuristic of the multi-user priority metric.

12. The apparatus according to claim 11, wherein the instructions, when executed by the at least one processor, cause the apparatus at least to:
    select one beam at a time for each stage.

13. The apparatus according to claim 11, wherein the instructions, when executed by the at least one processor, cause the apparatus at least to:
    calculate a user priority metric representing a relative priority of a user in scheduling;
    calculate a beam priority metric using at least the user priority metric;

perform mathematical transformations to the beam priority metric; and
encode the transformed beam priority metric.

14. The apparatus according to claim 11, wherein the instructions, when executed by the at least one processor, cause the apparatus at least to:
determine beam neural network metrics that represent at least one of normalized selection probabilities or Q-values of a Bellman equation, using the encoded beam priority metric; and
select at least one beam based on the beam neural network metrics, at least by comparing the beam neural network metrics with a common threshold to discriminate among beams.

15. The apparatus according to claim 11, wherein the instructions, when executed by the at least one processor, cause the apparatus at least to select the at least one beam by sorting the beams according to the beam neural network metrics and selecting first L beams from the sorted beams.

16. The apparatus according to claim 11, wherein the instructions, when executed by the at least one processor, cause the apparatus at least to:
after selecting said at least one beam, discard, from selection at future stages, other beams that cause high cross-beam interference to said selected at least one beam.

17. The apparatus according to claim 11, wherein the instructions, when executed by the at least one processor, cause the apparatus at least to:
determine a final beam selection from among the candidate beam selections via a selection criterion, and
determine a set of users from the final beam selection by at least one of discarding un-associated users or selecting a best user of each beam.

18. A non-transitory computer readable medium comprising program instructions stored thereon for performing the method according to claim 1.

* * * * *